United States Patent
Meter

(10) Patent No.: US 9,974,286 B2
(45) Date of Patent: May 22, 2018

(54) EGG TRAY FOR INCUBATING AND HATCHING EGGS

(71) Applicant: HatchTech Group B.V., Veenendaal (NL)

(72) Inventor: Tjitze Meter, Veenendaal (NL)

(73) Assignee: HatchTech Group B.V., Veenendaal (NL)

( * ) Notice: Subject to any disclaimer, the term of this patent is extended or adjusted under 35 U.S.C. 154(b) by 0 days. days.

(21) Appl. No.: 15/500,130

(22) PCT Filed: Jul. 31, 2015

(86) PCT No.: PCT/NL2015/050559
§ 371 (c)(1),
(2) Date: Jan. 30, 2017

(87) PCT Pub. No.: WO2016/018154
PCT Pub. Date: Feb. 4, 2016

(65) Prior Publication Data
US 2017/0265439 A1    Sep. 21, 2017

(30) Foreign Application Priority Data

Jul. 31, 2014   (NL) .................................... 2013281

(51) Int. Cl.
*A01K 41/00*   (2006.01)
*A01K 41/06*   (2006.01)
*A01K 39/014*  (2006.01)
*A01K 43/00*   (2006.01)

(52) U.S. Cl.
CPC .......... *A01K 41/065* (2013.01); *A01K 39/014* (2013.01); *A01K 43/00* (2013.01)

(58) Field of Classification Search
CPC ...... A01K 41/065; A01K 41/00; A01K 41/06; A01K 45/005; A01K 31/002; A01K 41/02; A01K 41/023; A01K 41/026; A01K 41/04
USPC ......................................... 119/322–327, 347
See application file for complete search history.

(56) References Cited

U.S. PATENT DOCUMENTS

| | | |
|---|---|---|
| 3,860 A | 12/1844 | Wieting |
| 335,961 A | 2/1886 | Renwick |
| 456,794 A | 7/1891 | Burr |
| 832,395 A | 10/1906 | Lee |
| 1,115,236 A | 10/1914 | Nichols |
| 1,384,084 A | 7/1921 | Myers |
| 1,626,394 A | 4/1927 | Coatsworth |

(Continued)

FOREIGN PATENT DOCUMENTS

| WO | 94/15454 A1 | 7/1994 |
|---|---|---|
| WO | 2007/018430 A1 | 2/2007 |

OTHER PUBLICATIONS

MicroClimer 88 Series; incubation technology for Optimal and uniform chick quality, http://www.hatchtech.nl/incubationtechnology/microclimer_2.php?lang=uk, Feb. 5, 2013.

*Primary Examiner* — Trinh T Nguyen
(74) *Attorney, Agent, or Firm* — NLO; Catherine A. Shultz; Lindsey A. Auerbach

(57) ABSTRACT

The invention relates to a tray for containing a number of eggs in an incubation chamber, the tray comprising a number of egg accommodation spaces in which space an egg is able to be hatched, and at least one passage for a chicken through which passage a chicken hatched from said egg may pass through the tray and enter a chicken accommodation space located below the tray.

23 Claims, 6 Drawing Sheets

(56) References Cited

U.S. PATENT DOCUMENTS

| | | | |
|---|---|---|---|
| 2,526,939 A | 10/1950 | Edwards |
| 3,147,738 A | 9/1964 | Theilig |
| 4,004,552 A | 1/1977 | Levin |
| 4,398,499 A | 8/1983 | Blakely |

EGG TRAY FOR INCUBATING AND HATCHING EGGS

BACKGROUND

The present invention relates to a tray for containing a number of eggs in an incubation chamber, the tray comprising a number of egg accommodation spaces in which space an egg is able to be hatched.

The present invention further relates to an assembly of a crate providing a chicken accommodation space for hatching and rearing chicken and a said tray.

The present invention further relates to a method for hatching a number of eggs

Such a tray is known from and holds in general as much eggs as possible to utilize the capacity of a brooding machine or setter. It is known to arrange an egg in a hole in the bottom face of the tray. However these holes are not suitable for allowing passage for a chicken. Also, the egg will be held in the hole such that the tray can be manipulated e.g. tilted in the airflow. This means that in use of the tray, the hole will be closed off and remain closed off by the eggshell.

It is known to place trays in a stable for rearing chicken. However, such a stable does not provide ideal conditions for a newly hatched chicken. In addition, the chicken need to climb over eggshells and/or other chicken to leave the tray. Also, potentially all chicken in the stable may contact the eggshells that are a potential source of germs and/or hurt themselves at the eggshells.

Hatcher baskets, like crates, for hatching/coming out of chickens are known. An important disadvantage of such a crate is that the eggshells pollute the accommodation wherein the hatched chicken live. These eggshells are a potential source of germs. In addition, the eggs and eggshells limit the walking space of the hatched chicken.

U.S. Pat. No. 4,398,499A relates to a tray for poultry incubation and hatching. This known tray is adapted to contain poultry eggs during both incubation and hatching.

Hatching machines are known as well e.g. from EP1104987 (B1). However these machines do have the same disadvantage that the eggshells pollute the accommodation wherein the hatched chicken stay.

Method and Machines for initial rearing of chicken are known from EP2174081 A1. This machine provides a clean environment and optimal growing conditions to newly hatched chickens but without hatching the chickens.

SUMMARY OF THE INVENTION

The invention aims to provide a tray for containing a number of eggs in an incubation chamber, which tray enables not only to hold eggs but also to hatch eggs and separate the newly hatched chicken as soon as possible from eggshells without need for handling the chicken and/or the chicken leaving the incubation chamber.

Another object of the invention is to provide an improved tray for containing a number of eggs in an incubation chamber, wherein the tray solves at least partly a problem associated with known trays.

Yet another object of the invention is to provide an alternative tray for containing a number of eggs in an incubation chamber.

According to a first aspect of the invention this is realized with a tray for containing a number of eggs in an incubation chamber, the tray comprising a number of egg accommodation spaces in which space an egg is able to be hatched, wherein a first egg accommodation space comprises, seen from the first egg accommodation space, an inwardly protruding member for supporting an egg in the first egg accommodation space and an outwardly protruding member for supporting an egg in an adjacent egg accommodation space. Because of the first egg accommodation space having an inwardly protruding member for supporting an egg and an outwardly protruding member for supporting an egg in an adjacent egg accommodation space, the tray enables to provide a passage with a constant area as along the height of the passage. In practice this means that there is no narrowing experienced by a chicken passing through the passage. In addition, the inwardly and outwardly protruding members offer freedom to arrange the accommodation spaces in an efficient pattern, as each egg accommodation space forms also a passage for chicks.

An egg accommodation space in which space an egg is able to be hatched means that an egg is firmly held in said space such that the tray may be manipulated in an forced air flow in the incubation chamber. This handling, e.g. tilting of the tray, is common in industry during the logistic process of the tray filled with eggs, in particular during incubation, to ensure for example an even distribution of the air flow around the eggs over time. The incubation chamber is a room which is suitable to be conditioned by a forced air flow such that e.g. temperature can be controlled with accuracy of 0.5 or even 0.1° C.

The invention is described referring to a first egg accommodation space and an adjacent egg accommodation space. It will be clear that what is an inwardly protruding member in the first egg accommodation space, constitutes an outwardly protruding member in an adjacent egg accommodation space. A It will be apparent that usually all of the number of egg accommodation spaces of the tray are implemented according to the invention.

The first egg accommodation space comprises a passage through which a newly hatched chicken may pass through the tray and enter a chicken accommodation space located below the tray, wherein the passage is at least delimited by the inwardly protruding member and the outwardly protruding member.

In particular, a number of egg accommodation spaces comprises a passage for chicken. More particular, all of the number of egg accommodation spaces of the tray comprise a passage for newly hatched chicken. This way there is freedom to lay the eggs in a desired pattern and leave passages open where needed. Most likely a desired pattern involves that each egg accommodation space adjoins a passage for a chicken. This even more optimizes the transition of chicken from the tray to a chicken accommodation space located below the tray.

In an embodiment of the tray the inwardly protruding member and the outwardly protruding member comprise a curved surface, in particular a double curved surface. The curved surface provides a smooth contact area for a newly hatched chicken when passing through the passage, such that there is no harm for the chicken. The double curved surface of the inwardly protruding member is convex as seen from the first egg accommodation space, and the double curved surface of the outwardly protruding member is concave as seen from the first egg accommodation space. In other words, one the one hand the protruding members function as support members for firmly holding an egg and on the other hand the protruding members are configured such that a chicken may safely pass the protruding members without damage.

Preferably, the inwardly protruding member and the outwardly protruding member have a similar, preferably identical configuration such that a cross sectional area of the passage is essentially constant along a central axis of the first egg accommodation space. This realizes in practice that a chicken experiences no narrowing when passing through the passage.

In an embodiment, the first egg accommodation space is delimited by a circumferential wall which extends in circumferential direction around the central axis and has wall sections wherein the inwardly protruding member and the outwardly protruding member are provided on different wall sections. In particular, each wall section is provided with one protrusion for supporting an egg. It may however be conceivable that a single wall section is provided with the inwardly protruding member and the outwardly protruding member. However important is that the inwardly protruding member and the outwardly protruding member alternate with each other seen in the circumferential direction.

In an embodiment, the circumferential wall is provided with, as seen in the circumferential direction, alternately the inwardly protruding member and the outwardly protruding member.

In an embodiment, a wall section extends between the first accommodation space and the adjacent egg accommodation space and separates said first and adjacent egg accommodation space. In particular, each wall section separates adjacent egg accommodation spaces.

In an embodiment of the tray, the first egg accommodation space is delimited by six wall sections. In particular, all egg accommodation spaces are each delimited by six wall sections.

In an embodiment of the tray, wall sections of the six wall sections are provided with, as seen in the circumferential direction, alternately the inwardly protruding member and the outwardly protruding member.

In an embodiment of the tray, the passage is configured such that a chicken may pass the passage and an egg is not passable through the passage. This ensures separation of the eggs or eggshells form the chicken in their initial rearing because eggs and eggshells are left in the tray while chicken may pass through the passage to a chicken accommodation space located below the tray.

In an embodiment, the passage has an Y-shaped cross-section. This is considered an optimal shape with respect to a chicken because it enables to allow passage of the widest part of a chicken without requiring a great surface area for the passage.

In an embodiment, the tray comprises a raised edge at the outline of the tray for keeping hatched chicken on the tray. It is noted that, in use, while keeping hatched chicken on the tray, the tray may contain a number of eggs that still have not hatched.

In an embodiment, the tray is configured such that the tray is stackable for providing a stack of a number of trays.

According to a further aspect of the invention this is realized with an assembly of a crate providing a chicken accommodation space for hatching and rearing chicken and a tray according to the invention arranged on top of the crate, the crate having an open top such that a chicken may enter the chicken accommodation space through the passage. The crate is suitable to be placed in a conditioned space like a hatcher and takes advantage of the forced air flow in such a hatcher because of the open structure of the crate. In this case, the crate has a series of ventilation slits. Such a crate or hatcher basket has a bottom face and sidewalls for keeping chicken in the crate. The bottom face and sidewall provide the chicken accommodation space.

In an embodiment of the assembly, the tray is arranged on top of the crate in a removable manner. In particular, the crate comprises a tray receiving space which is suitable to receive the tray in a sliding manner. This way, a tray may be easily slid from one side of the crate above the chicken accommodation space of the crate, even when crates are stacked.

In an embodiment of the assembly, the crate and the tray are integrally formed.

In an embodiment of the assembly, the crate comprises a trough for containing feed for chicken. This enables feeding of the chicken shortly after hatching in the same conditioned chamber without intervention by a chicken handling device or operator.

In an embodiment of the assembly, the crate comprises at least one transparent portion for observing the chicken and allowing light to enter the chicken accommodation space.

According to a further aspect of the invention this is realized with a stack of a number of assemblies according to the invention. The crates including a tray, are suitable to be stacked and such a stack may be positioned in a conditioned chamber.

According to a further aspect of the invention this is realized with a method for hatching a number of eggs, the method comprising the steps of:
 placing the eggs in a tray according to the invention,
 arranging the tray on top of a crate, which crate provides a chicken accommodation space,
 incubating the eggs for a required brooding period until hatching occurs,
 passing of hatched chicken from the tray, through the passage and into the chicken accommodations space of the crate.

In an embodiment, the method comprises providing feed and/or water for the hatched chicken in the chicken accommodation space of the crate.

In an embodiment, the method comprises the steps of:
 candling eggs in the tray for detecting non-hatchable eggs in the tray,
 removing detected non-hatchable eggs from their respective egg accommodation spaces,
 passing of a newly hatched chicken through a passage that results from the removing of the detected non-hatchable eggs from their respective egg accommodation spaces.

Candling per se is a well known process in the field of hatching and incubating technology. Removing of a non-hatchable egg, which in itself is undesirable, now beneficially provides a passage for a chicken. This way, the loadfactor of a tray can even more be improved.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to an preferred embodiment shown in the drawing wherein shown in.

DETAILED DESCRIPTION OF EMBODIMENTS

Figure 1:
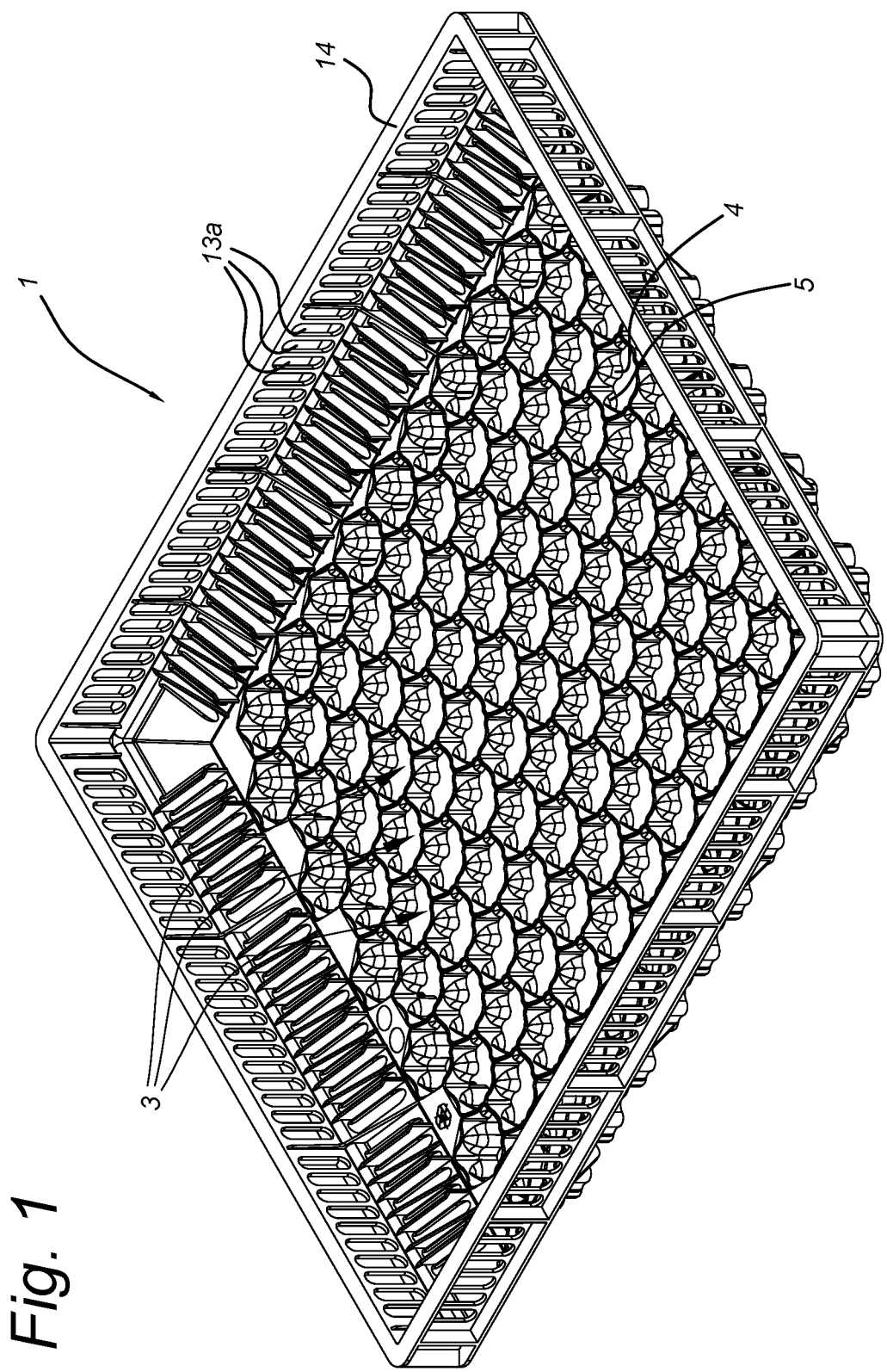
FIG. 1 in perspective view a tray according to the invention.
Figure 2:
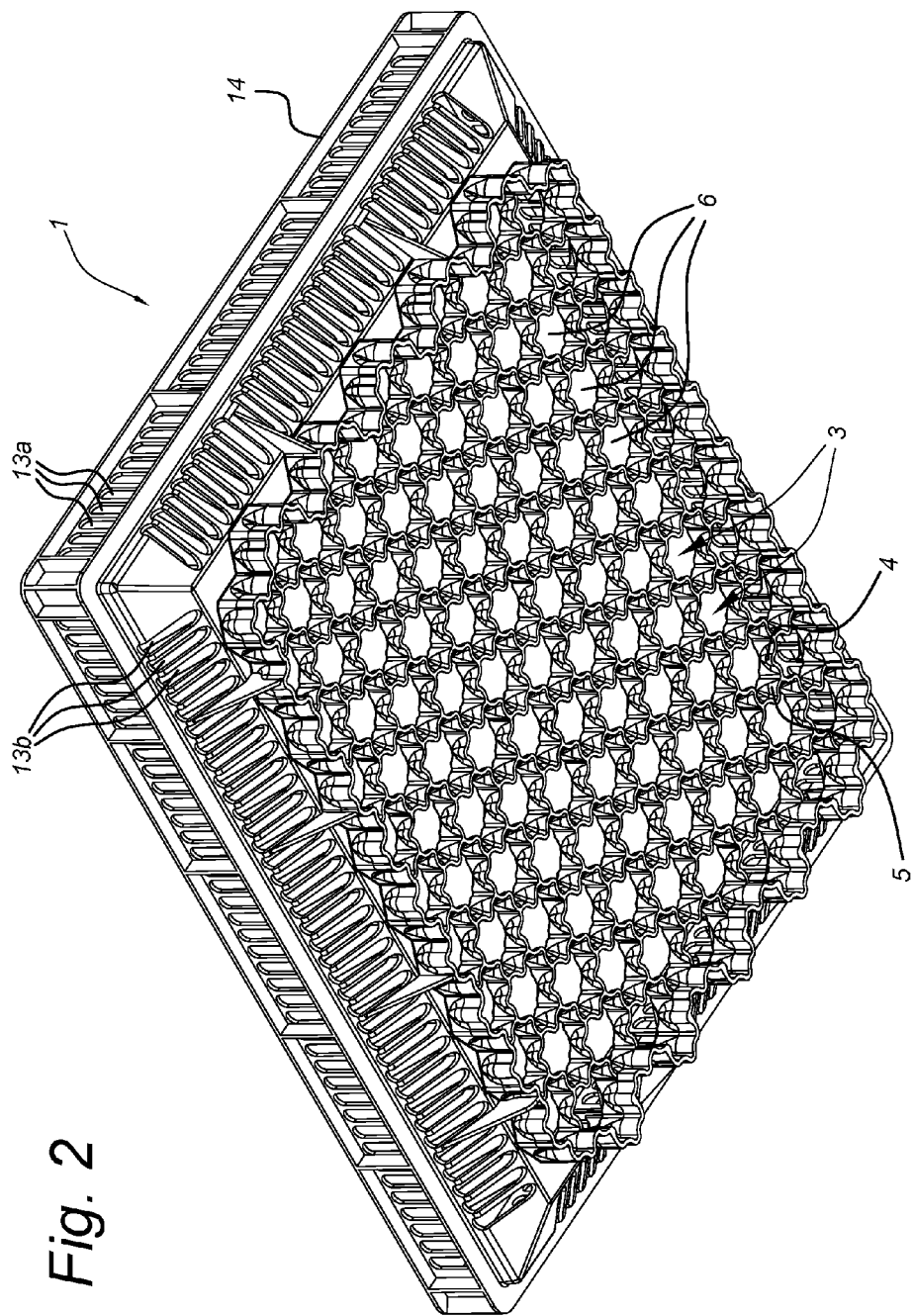
FIG. 2 the tray according to FIG. 1 in perspective view from the bottom.

The invention will be described referring to all figures. The invention is described referring to a first egg accommodation space 3. It will be clear that this can be any accommodation space of the tray 1. In the figures an embodiment of a tray 1 according to the invention is shown. In use, the tray 1 contains a number of eggs 2. The tray is for use in an incubation chamber which is not shown. This is clear from e.g. the plurality of ventilation slits 13a, 13b that enable to impose a desired climate provided by the incubation chamber onto the interior of the tray 1. The tray 1 comprises a number of separate egg accommodation spaces 3. In this space 3 the eggs are firmly held such that the eggs may be hatched in a controlled manner. Here, the eggs are firmly held in a egg accommodation space between a number of inwardly protruding members 4, in this case three members 4 for each accommodation space 3. The inwardly protruding member 4 and the outwardly protruding member 5 comprise a double curved surface 6, 7. Therefore, eggs of different size can be accommodated in each egg accommodation space 3.

Figure 4:
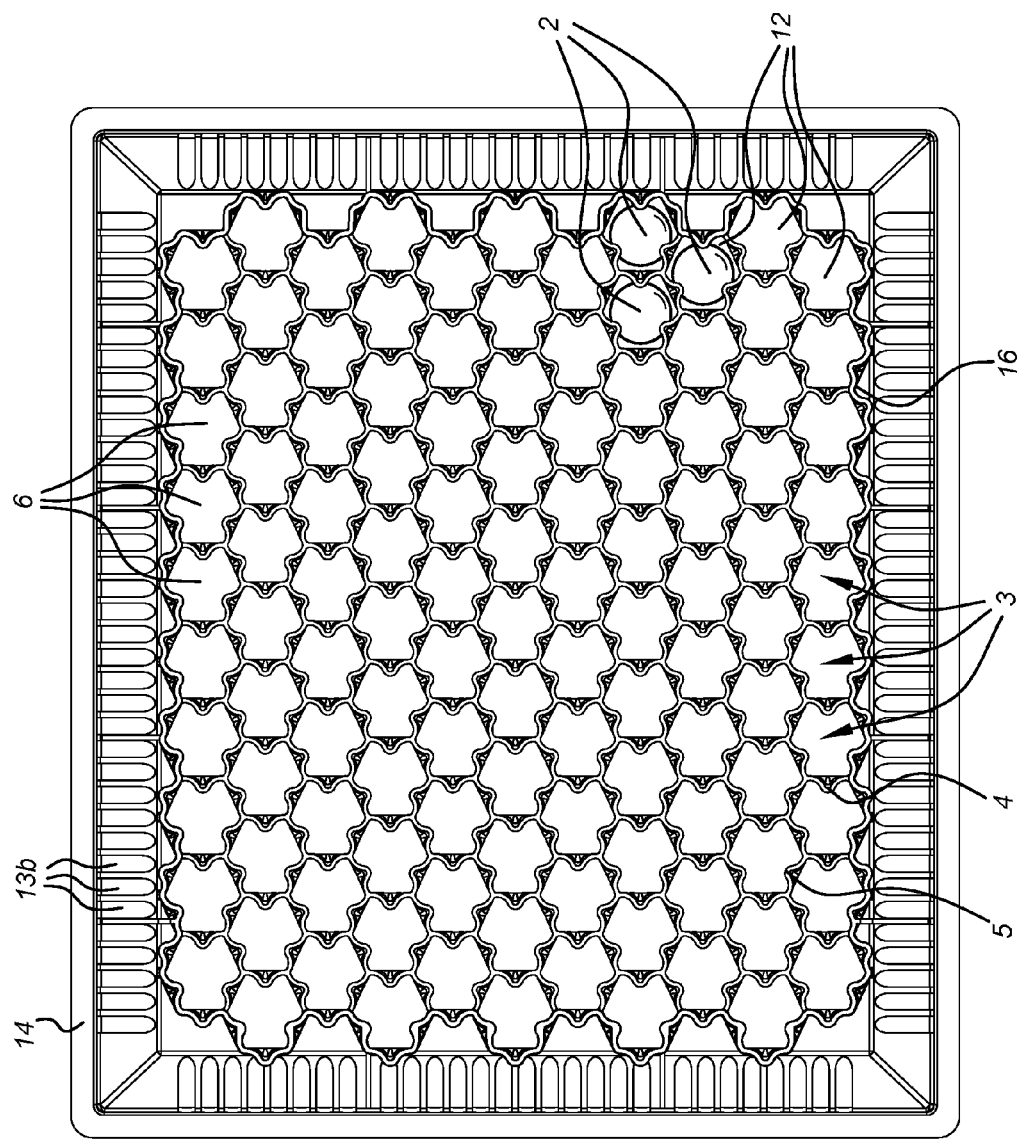
FIG. 4 a bottom view of the tray of fig.
Figure 5:
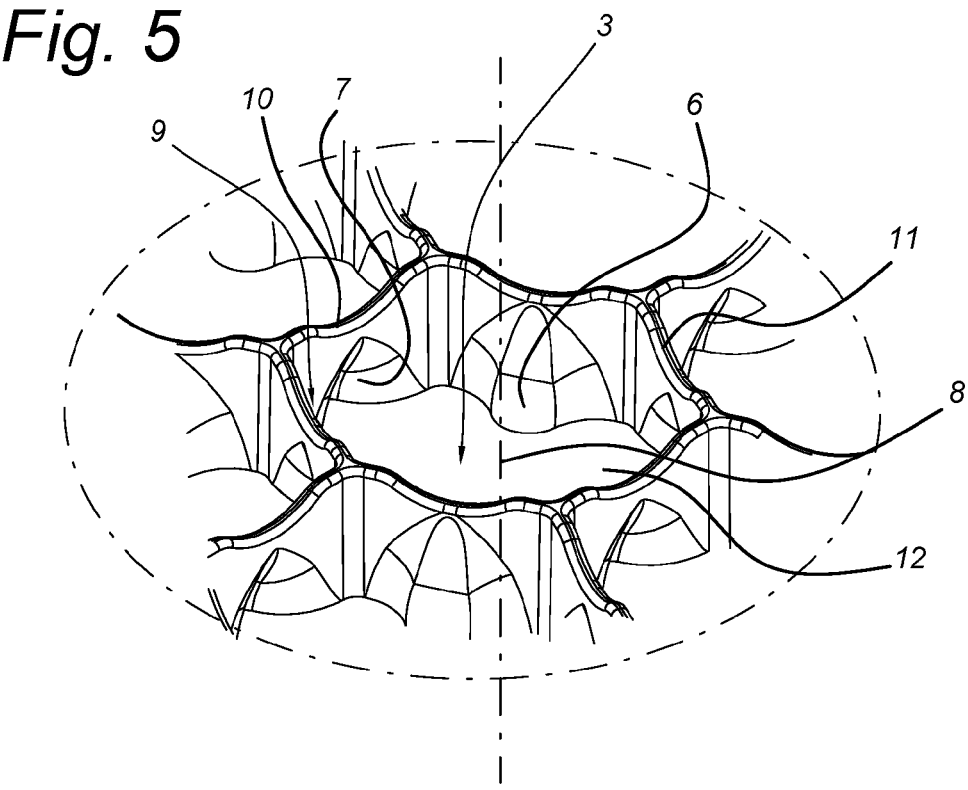
FIG. 5 a detail of FIG. 1.
Figure 6:
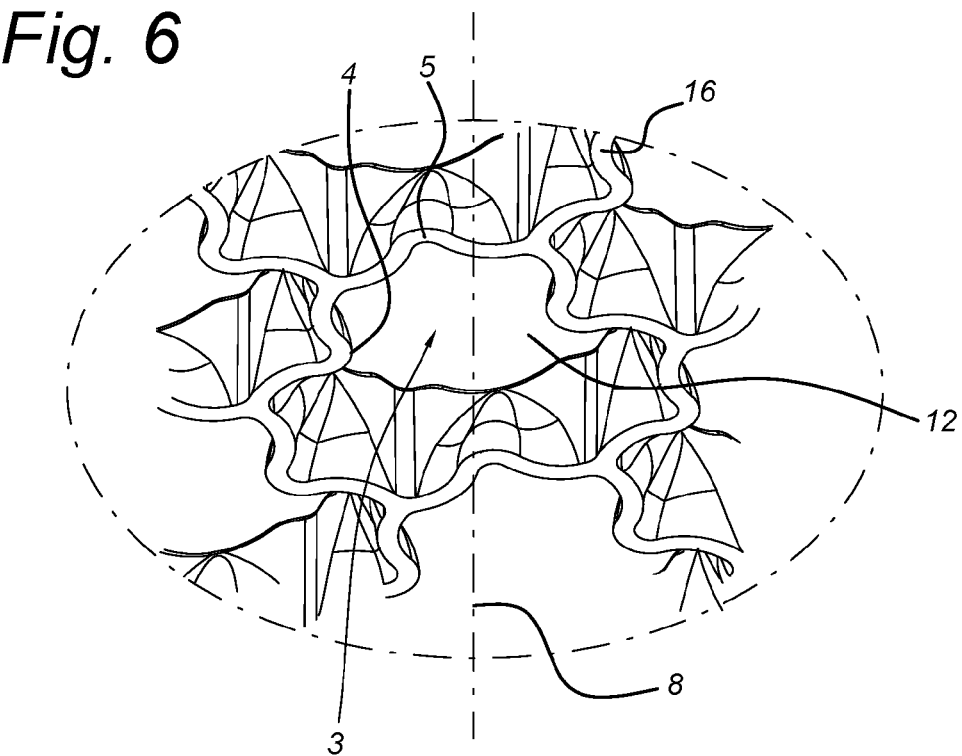
FIG. 6 a detail of FIG. 2.

As can be best seen from FIGS. 5 and 6, the double curved surface 6 of the inwardly protruding member 4 is convex as seen from the first egg accommodation space 3. The double curved surface 7 of the outwardly protruding member 5 is concave as seen from the first egg accommodation space 3. The inwardly protruding member 4 and the outwardly protruding member 5 have an identical configuration. In view of the thin-walled structure of both the inwardly protruding member 4 and the outwardly protruding member 5 this provides a cross sectional area of the passage that is essentially constant along the central axis 8 of the first egg accommodation space 3. The inwardly protruding member 4 and the outwardly protruding member 5 are hollow as seen from the bottom, see FIG. 4, such that no dirt can accumulate during use.

Figure 3:
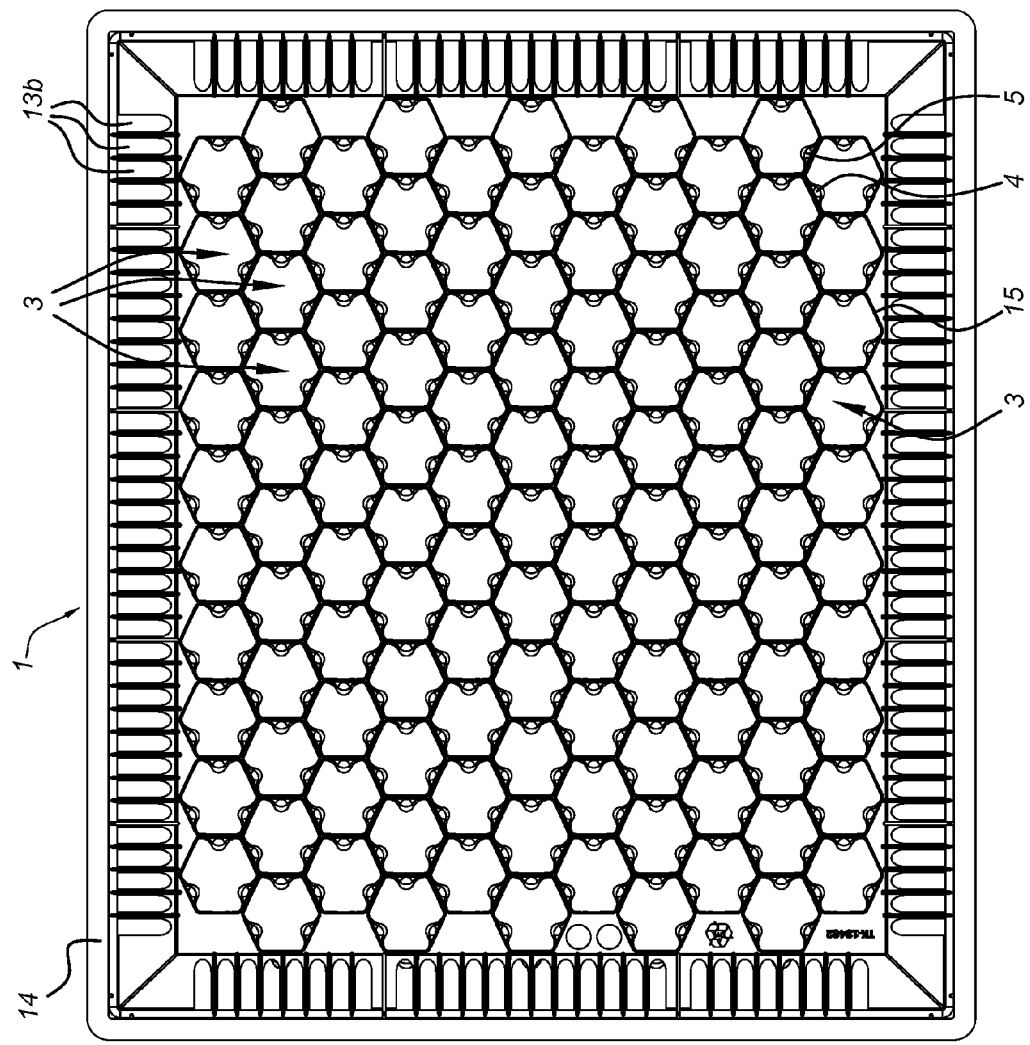
FIG. 3 a top view of the tray of FIG. 1.

The first egg accommodation space 3 is delimited by a circumferential wall 9. The wall 9 extends in circumferential direction around the central axis 8 of the first egg accommodation space 3. The wall 9 has wall sections 10, 11, in this case 6 wall sections. Each egg accommodation space 3 has a hexagonal shape and therefore individual egg accommodation spaces 3 connect seamlessly and provide a tray with a honeycomb pattern which is illustrated by a virtual grid 15 shown in FIG. 3. Each wall section 10, 11 extends between the first accommodation space 3 and the adjacent egg accommodation space and separates said first and adjacent egg accommodation space. The wall sections 10, 11 of the wall 9 of the first egg accommodation space 3 blend seamlessly into a lower edge 16 as shown in FIG. 6. The lower edges 16 of individual accommodation spaces 3 build a regular pattern as can be seen in FIG. 4.

In this case, each wall section 10, 11 is provided with a protruding member 4, 5. The "inwardly" or "outwardly" is from perspective of an individual egg accommodation space 3. In fact, adjacent egg accommodation spaces 3 share a common protrusion 4, 5. The circumferential wall 9 is provided with, as seen in the circumferential direction, alternately the inwardly protruding member 4 and the outwardly protruding member 5.

The inwardly protruding member 4 and the outwardly protruding member 5 are integral with the circumferential wall 9. Here, the inwardly protruding member 4 and the outwardly protruding member 5 blend seamlessly into a lower edge 16.

Each egg accommodation space 3 of the tray 1 has a passage 12 for a chicken through which passage 12 a chicken hatched from an egg may pass through the tray 1 and enter a chicken accommodation space (not shown) located below the tray 1. The passage 12 is defined by inwardly protruding members 4 and outwardly protruding members 5. The passage 12 is configured such that a chicken may pass the passage 4 and an egg is not passable through the passage 12. When the first egg accommodation space 3 is occupied by an egg, the passage 12 is closed off to such an extent that a chicken is not able to pass through the passage 12 of the first egg accommodation space 3. When no egg is present in the first egg accommodation space 3, a chicken is able to pass through the passage 12 of the first egg accommodation space 3.

The tray comprises a raised edge 14 at the outline of the tray 1 for keeping hatched chicken on the tray 1. As the egg accommodation space 3 comprises a passage 12 for a chicken, a left open, that is not filled with an egg, egg accommodation space functions, in use, as a passage. The inwardly protruding members 4 and outwardly protruding members 5 are configured such that a chicken may safely pass said support member without damage.

Figure 7:
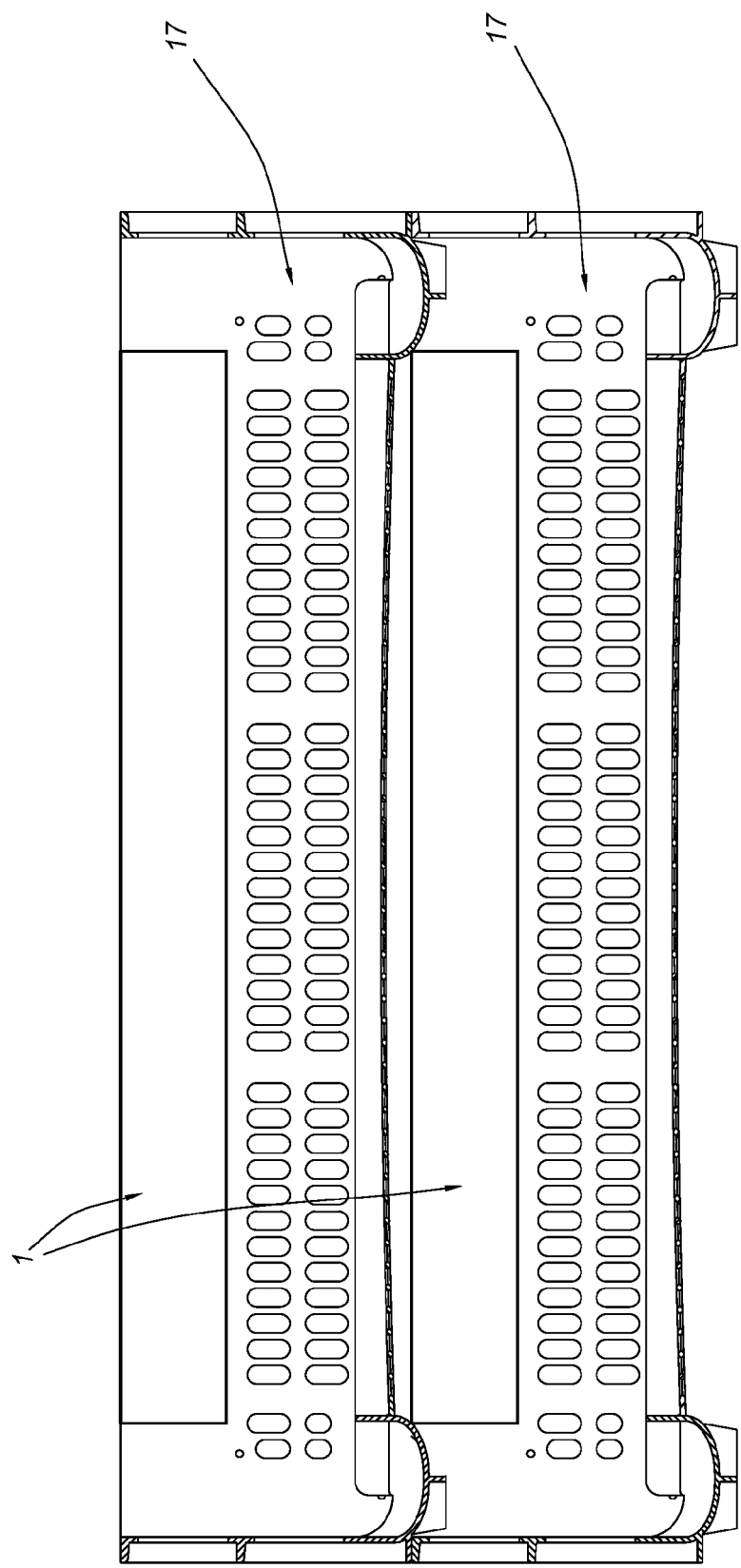
FIG. 7 a stack of assemblies of a crate and a tray according to the invention.

FIG. 7 shows a stack of assemblies of a crate 17 and a tray 1 according to the invention. The tray 1 is schematically shown here, without any details. The crate 17 provides a chicken accommodation space for hatching and rearing chicken. The tray 1 is arranged on top of the crate 17. Therefore, the crate has an open top such that a chicken may enter the chicken accommodation space through the passage. The crate 17 is suitable to be placed in a conditioned space like a hatcher and takes advantage of the forced air flow in such a hatcher because of the open structure of the crate. In this case, the crate has a series of ventilation slits. Such a crate or hatcher basket has a bottom face and sidewalls for keeping chicken in the crate. The bottom face and sidewall provide the chicken accommodation space.

Here, the tray 1 is arranged on top of the crate 17 in a removable manner.

During use of the tray 1 in assembly with a crate 17, the following steps are taken for hatching a number of eggs:
  placing the eggs in a tray 1 which tray comprises at least one passage 12 for a chicken through which passage 12 a chicken may pass through the tray 1 and enter a chicken accommodation space located below the tray 1,
  arranging the tray 1 on top of a crate, which crate provides a chicken accommodation space,
  brooding the eggs for a required brooding period until hatching occurs,
  passing of hatched chicken from the tray 1, through the passage 12 and into the chicken accommodations space of the crate.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A tray for containing a number of eggs in an incubation chamber, the tray comprising a number of egg accommodation spaces in which space an egg is able to be hatched, wherein a first egg accommodation space comprises, seen from the first egg accommodation space, an inwardly protruding member for supporting an egg in the first egg accommodation space and an outwardly protruding member for supporting an egg in an adjacent egg accommodation space, wherein the first egg accommodation space comprises a passage configured to allow a newly hatched chicken to pass through the tray and enter a chicken accommodation space located below the tray, wherein the passage is at least delimited by the inwardly protruding member and the outwardly protruding member, wherein the first egg accommodation space is delimited by a circumferential wall which extends in circumferential direction around the central axis and is formed of wall sections, with wall sections having an inwardly protruding member and an outwardly protruding member.

2. The tray according to claim 1, wherein the inwardly protruding member and the outwardly protruding member comprise a curved surface.

3. The tray according to claim 1, wherein the inwardly protruding member and the outwardly protruding member comprise a double curved surface.

4. The tray according to claim 3, wherein the double curved surface of the inwardly protruding member is convex as seen from the first egg accommodation space.

5. The tray according to claim 3, wherein the double curved surface of the outwardly protruding member is concave as seen from the first egg accommodation space.

6. The tray according to claim 1, wherein the inwardly protruding member and the outwardly protruding member have a configuration such that a cross sectional area of the passage is essentially constant along a central axis of the first egg accommodation space.

7. The tray according to claim 1, wherein the circumferential wall is provided with, as seen in the circumferential direction, alternately the inwardly protruding member and the outwardly protruding member.

8. The tray according to claim 1, wherein a wall section extends between the first accommodation space and the adjacent egg accommodation space and separates said first and adjacent egg accommodation space.

9. The tray according to claim 1, wherein the first egg accommodation space is delimited by six wall sections which are provided with, as seen in the circumferential direction, alternately the inwardly protruding member and the outwardly protruding member.

10. The tray according to claim 1, wherein each egg accommodation space is delimited by six wall sections.

11. The tray according to claim 1, wherein a number of egg accommodation spaces comprises a passage for chicken.

12. The tray according to claim 1, wherein each egg accommodation space comprises a passage for a chicken.

13. The tray according to claim 1, wherein the passage has an Y-shaped cross-section.

14. The tray according to claim 1, comprising a raised edge at the outline of the tray for keeping hatched chicken on the tray.

15. The tray according to claim 1, wherein the tray is configured such that the tray is stackable for providing a stack of a number of trays.

16. Assembly of a crate providing a chicken accommodation space for hatching and rearing chicken and a tray according to claim 1 arranged on top of the crate, the crate having an open top such that a chicken may enter the chicken accommodation space through the passage.

17. The assembly according to claim 16, wherein the tray is arranged on top of the crate in a removable manner.

18. The assembly according to claim 17, wherein the crate comprises a tray receiving space which is suitable to receive the tray in a sliding manner.

19. The assembly according to claim 16, wherein the crate and the tray are integrally formed.

20. The assembly according to a preceding claim 16, the crate comprising a trough for containing feed for chicken and/or at least one transparent portion for observing the chicken and allowing light to enter the chicken accommodation space.

21. A method for hatching a number of eggs, the method comprising the steps of:
    placing the eggs in a tray according to claim 1,
    arranging the tray on top of a crate, which crate provides a chicken accommodation space,
    incubating the eggs for a required brooding period until hatching occurs,
    passing of hatched chicken from the tray, through the passage and into the chicken accommodations space of the crate.

22. The method according to claim 21, comprising providing feed and/or water for the hatched chicken in the chicken accommodation space of the crate.

23. The method according to claim 21, comprising the steps of:
    candling eggs in the tray for detecting non-hatchable eggs in the tray,
    removing detected non-hatchable eggs from their respective egg accommodation spaces,
    passing of a newly hatched chicken through a passage that results from the removing of the detected non-hatchable eggs from their respective egg accommodation spaces.

* * * * *